(12) United States Patent
Karlsson

(10) Patent No.: US 12,092,139 B2
(45) Date of Patent: Sep. 17, 2024

(54) HINGE FOR LOAD TRANSPORT TROLLEYS

(71) Applicant: Hilti Aktiengesellschaft, Schaan (LI)

(72) Inventor: Kenth Karlsson, Wasserburg (DE)

(73) Assignee: Hilti Aktiengesellschaft, Schaan (LI)

( * ) Notice: Subject to any disclaimer, the term of this patent is extended or adjusted under 35 U.S.C. 154(b) by 859 days.

(21) Appl. No.: 17/253,057

(22) PCT Filed: Jul. 1, 2019

(86) PCT No.: PCT/EP2019/067508
§ 371 (c)(1),
(2) Date: Dec. 16, 2020

(87) PCT Pub. No.: WO2020/011571
PCT Pub. Date: Jan. 16, 2020

(65) Prior Publication Data
US 2021/0277922 A1    Sep. 9, 2021

(30) Foreign Application Priority Data

Jul. 10, 2018  (EP) ..................................... 18182713

(51) Int. Cl.
*F16B 2/18*       (2006.01)
*B62B 1/12*       (2006.01)

(52) U.S. Cl.
CPC ................ *F16B 2/185* (2013.01); *B62B 1/12* (2013.01); *B62B 2205/33* (2013.01)

(58) Field of Classification Search
CPC ....... B62B 1/12; B62B 7/145; B62B 2205/32; B62B 2205/33; F16B 2/18; F16B 2/185;
(Continued)

(56) References Cited

U.S. PATENT DOCUMENTS 4,448,434 A * 5/1984 Anderson ................. B62B 1/12
                                                 280/654
4,906,053 A * 3/1990 Kawai .................... B60B 27/023
                                                 301/124.2
(Continued)

FOREIGN PATENT DOCUMENTS

CA          2616482 A1    6/2009
CN       104875661 A      9/2015
(Continued)

OTHER PUBLICATIONS

International Search Report of PCT/EP2019/067508, dated Sep. 26, 2019.

*Primary Examiner* — Josh Skroupa
(74) *Attorney, Agent, or Firm* — Davidson Kappel LLC

(57) ABSTRACT

Clamping device for variably positioning an angular setting of at least one shelf on a load transport trolley for transporting loads, preferably toolboxes. The clamping device includes a clamping lever for reversibly setting the clamping device in a clamped or released position, wherein, in the released position, the shelf is moveable; a pull rod which can be reversibly moved by the clamping lever into a first or second position, wherein the clamping device is in the clamped position when the pull rod is set into the first position, and the clamping device is in the released position when the pull rod is set into the second position; an attachment element for connecting the shelf to the clamping device; and a first and second connecting element for connecting the clamping device to a frame of the load transport trolley.

15 Claims, 18 Drawing Sheets

(58) Field of Classification Search
CPC .................... F16C 11/10; F16C 11/103; Y10T 403/32451; Y10T 403/32459; Y10T 403/595
USPC ...................................... 403/107, 108, 322.4
See application file for complete search history.

(56) References Cited

U.S. PATENT DOCUMENTS

| | | | | |
|---|---|---|---|---|
| 5,827,005 | A * | 10/1998 | Liu ........................ | F16C 11/10 403/322.1 |
| 6,053,514 | A | 4/2000 | Su et al. | |
| RE38,436 | E | 2/2004 | Su | |
| 7,351,000 | B2 * | 4/2008 | Meggiolan ............. | B62K 25/02 403/322.4 |
| 7,673,947 | B2 * | 3/2010 | Chang .................... | B62K 25/02 301/124.2 |
| 8,079,613 | B2 * | 12/2011 | Williams ............... | B60D 1/241 403/322.4 |
| 8,573,878 | B2 * | 11/2013 | Chang .................... | B62K 25/02 403/322.4 |
| 2014/0110447 | A1 | 4/2014 | Hilley et al. | |
| 2016/0354902 | A1 | 12/2016 | Fukui et al. | |

FOREIGN PATENT DOCUMENTS

| | | | | |
|---|---|---|---|---|
| CN | 205447176 U | | 8/2016 | |
| CN | 106061682 A | | 10/2016 | |
| DE | 2648349 A1 | * | 2/1978 | ............. F16C 11/10 |
| DE | 202010005860 U1 | | 2/2011 | |
| EP | 1929897 A1 | | 6/2008 | |

* cited by examiner

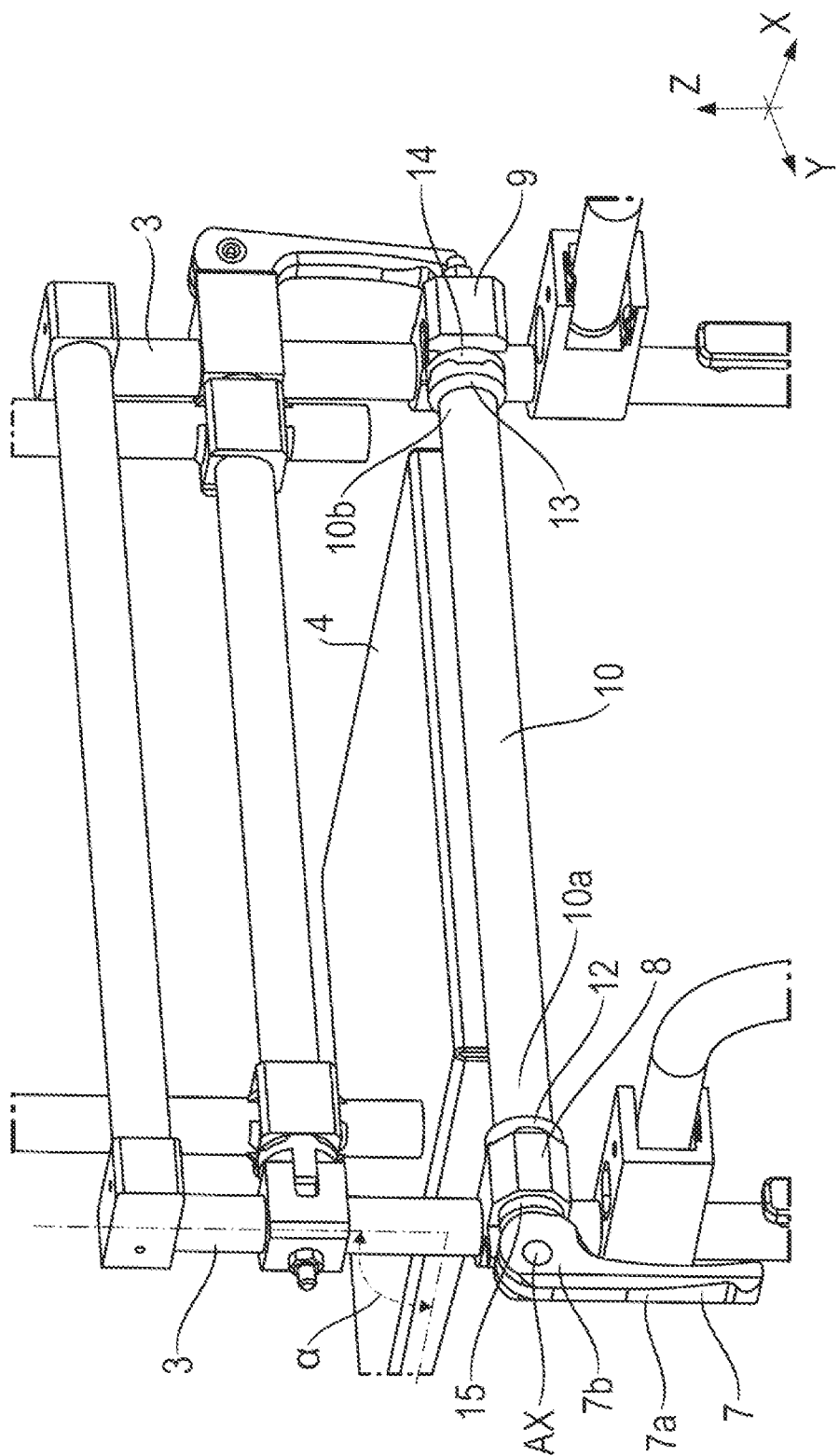

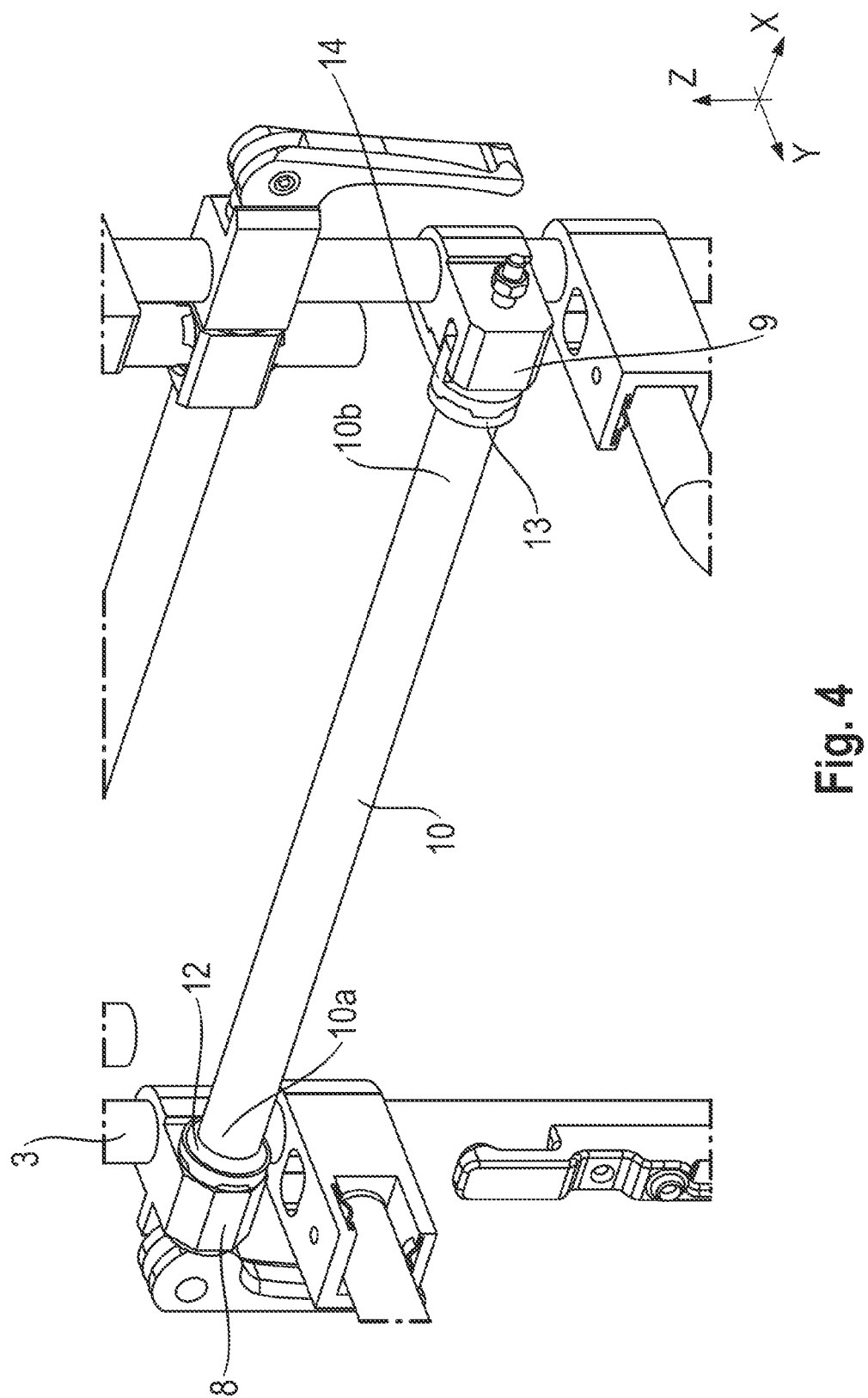

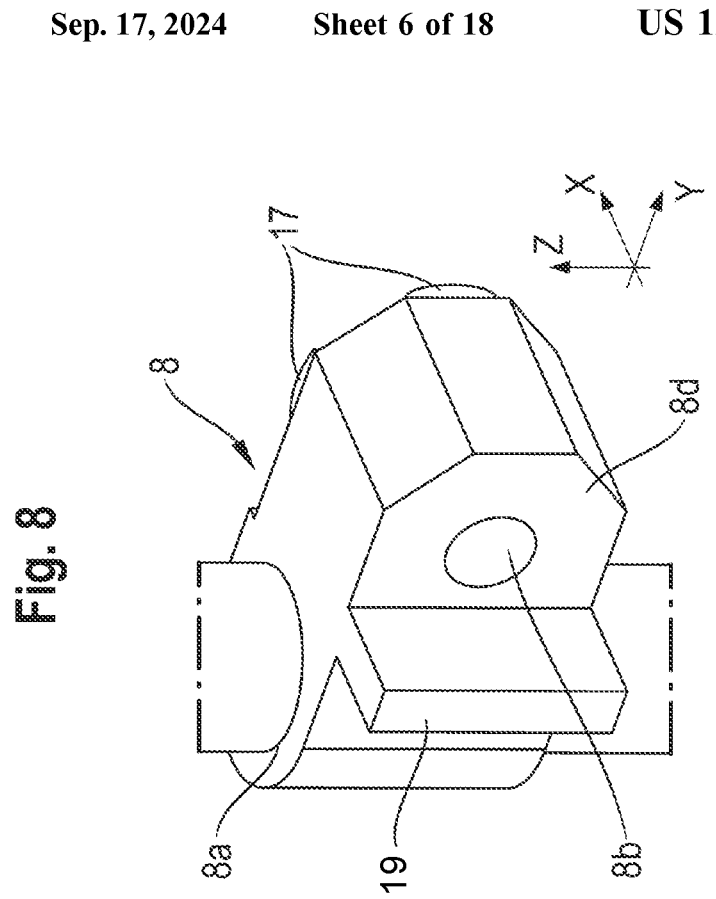

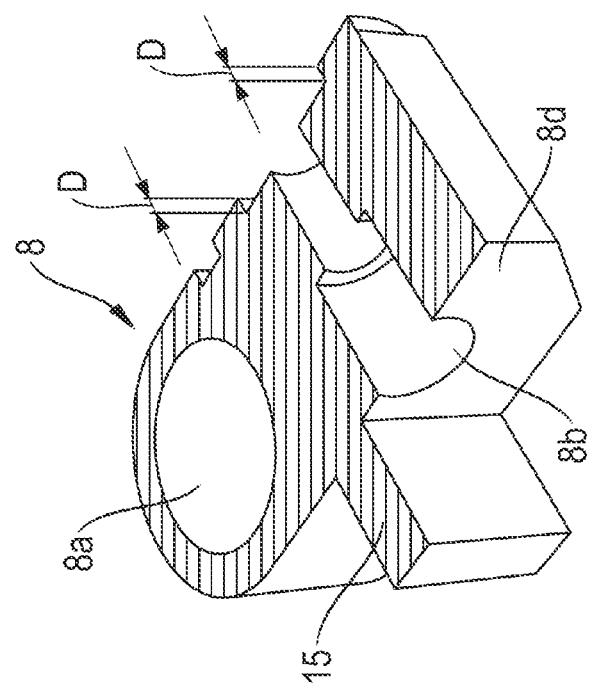
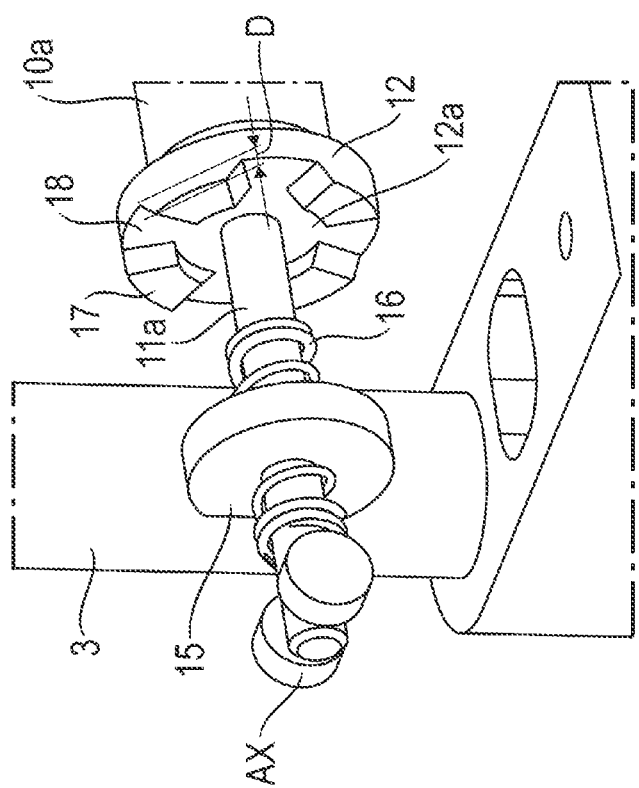

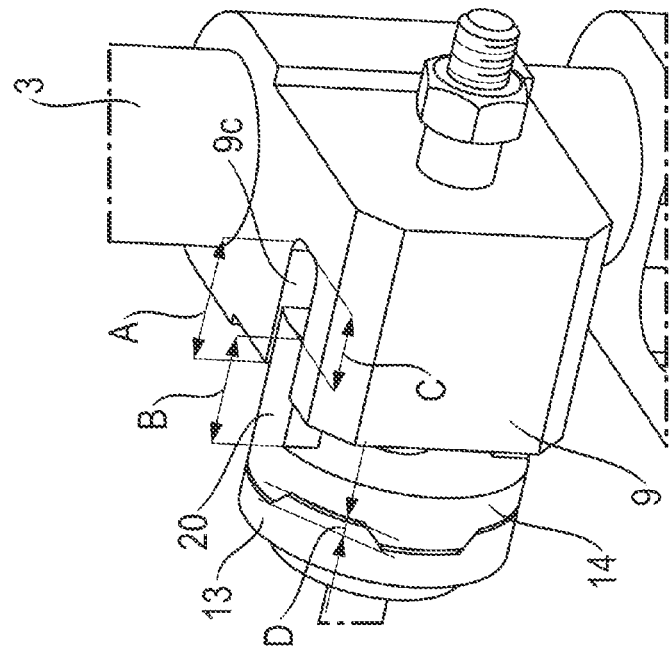
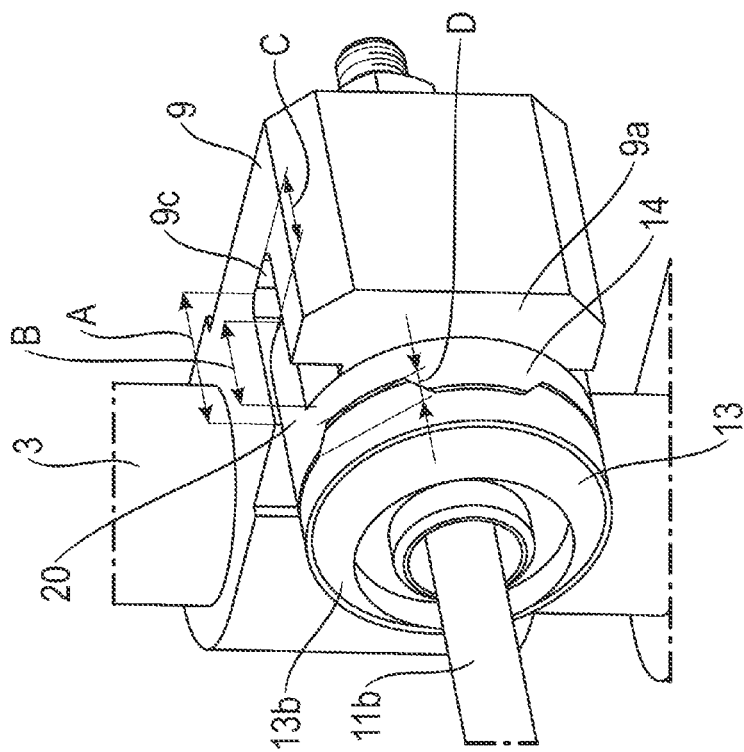
Fig. 26
Fig. 25

HINGE FOR LOAD TRANSPORT TROLLEYS

The present invention relates to a clamping device for variably positioning an angular setting of at least one shelf on a load transport trolley for transporting loads, preferably toolboxes.

BACKGROUND

Load transport trolleys of the type mentioned at the beginning are known in principle from the prior art, for example in the form of handcarts. Such load transport trolleys can have one or more shelves which serve to receive or bear loads. It is cus-tomary for said shelves to be rigidly and immovably fastened to the load transport trolley.

SUMMARY OF THE INVENTION

Rigid and immovable shelves on load transport trolleys can constitute a problem when the load transport trolley is intended to be stowed in a space-saving manner.

It is an object of the present invention to solve the aforementioned problem and in particular to provide a load transport trolley for transporting loads, preferably toolboxes, with said trolley being able to be stowed in a space-saving manner.

The present invention provides a clamping device for variably positioning an angular setting of at least one shelf on a load transport trolley for transporting loads, preferably toolboxes.

According to the invention, the clamping device comprises a clamping lever for reversibly setting the clamping device in a clamped or released position, wherein, in the released position, the shelf is moveable; a pull rod which can be reversibly moved by the clamping lever into a first or second position, wherein the clamping device is in the clamped position when the pull rod is set into the first position, and the clamping device is in the released position when the pull rod is set into the second position; an attachment element for connecting the shelf to the clamping device; and a first and second connecting element for connecting the clamping device to a frame of the load transport trolley.

It is thus possible in a simple manner for a shelf to be folded down flat such that the dimensions of the load transport trolley can be reduced.

The first position of the clamping lever here corresponds to a position of the clamping lever by which the clamping device is in the clamped position or in a clamped state. By contrast, the second position of the clamping lever corresponds to a position of the clamping lever by which the clamping device is in the released position or in the released state.

According to an advantageous embodiment, it can be possible that the attachment element is designed in the form of a cylindrical tube which is arranged around the pull rod. It is thus possible in a simple manner for the attachment element and the pull rod to be mounted on the load transport trolley in a space-saving manner.

According to a further advantageous embodiment, it can be possible that a first positioning element is provided at a first end of the attachment element, and a second positioning element is provided at a second end of the attachment element. The two positioning elements allow the attachment element connected to the shelf to be set in its position and orientation relative to the frame of the load transport trolley.

According to a further advantageous embodiment, it can be possible that the pull rod comprises a first end and a second end, wherein the first end can be connected to the clamping lever, and the second end can be connected to a blocking element, with the result that, when the clamping lever is moved from the clamped position into the released position, the pull rod is brought from the first position into the second position, wherein, in the first position, the first positioning element is in a form-fitting connection with the first connecting element, and the second positioning element is in a form-fitting connection with the blocking element, and wherein, in the second position, the first positioning element can be moved relative to the first connecting element, and the second positioning element can be moved relative to the blocking element.

According to a further advantageous embodiment, it can be possible that the pull rod comprises a first end and a second end, wherein the first end can be connected to the clamping lever, and the second end can be connected to a blocking element, with the result that, when the clamping lever is moved from the clamped position into the released position, the pull rod is brought from the first position into the second position, wherein, in the first position, the first positioning element is in a force-fitting connection with the first connecting element, and the second positioning element is in a force-fitting connection with the blocking element, and wherein, in the second position, the first positioning element can be moved relative to the first connecting element, and the second positioning element can be moved relative to the blocking element.

According to a further advantageous embodiment, it can be possible that the first positioning element comprises, on a first lateral surface, a plurality of elevations, and the first connecting element comprises, on a first lateral surface, a plurality of elevations which are designed to correspond to the elevations of the first positioning element, with the result that a force-fitting connection can be reversibly produced between the first lateral surface of the first connecting element and the first positioning element. Individual position settings for the attachment element connected to the shelf are possible by virtue of the plurality of elevations and the corresponding interspaces.

According to a further advantageous embodiment, it can be possible that the second positioning element comprises, on a first lateral surface, a plurality of elevations, and the blocking element comprises, on a first lateral surface, a plurality of elevations which are designed to correspond to the elevations of the second positioning element, with the result that a force-fitting connection can be reversibly produced between the first lateral surface of the blocking element and the second positioning element. Individual position settings for the attachment element connected to the shelf are possible by virtue of the plurality of elevations and the corresponding interspaces.

According to a further advantageous embodiment, it can be possible that the clamping lever comprises a rounded projection, whereby a force can be exerted on the pull rod when the clamping lever is moved from the clamped position into the released position, with the result that the pull rod is moved from the first position into the second position. A linear or vertical movement of the pull rod can be produced by the rounded projection with a rotary movement of the clamping lever.

According to a further advantageous embodiment, it can be possible that a spring element, which is designed as a compression spring, is provided between the clamping lever and the first connecting element, with the result that the clamping lever can be moved from the released position counter to a spring force of the spring element into the clamped position. The movement of the clamping lever from a clamped position into a released position can be facilitated by the energy which can be stored in the spring element.

According to a further advantageous embodiment, it can be possible that the blocking element comprises at least one pin, and the second connecting element comprises a recess for receiving and guiding the at least one pin, wherein the recess is designed to be longer in a direction X than the at least one pin, with the result that the at least one pin can be moved in the recess from a first position into a second position.

BRIEF DESCRIPTION OF THE DRAWINGS

Further advantages will emerge from the following description of the figures. The figures illustrate various exemplary embodiments of the present invention. The figures, the description and the claims contain numerous features in combination. A person skilled in the art will expediently also consider the features individually and combine them to produce useful further combinations.

In the figures, identical and similar components are denoted by identical refer-ence signs.

In the Figures:

FIG. 1 shows a perspective front view of a load transport trolley having a clamping device according to the invention;

FIG. 2 shows a perspective rear view of the load transport trolley having the clamping device according to the invention;

FIG. 3 shows a detail view of the clamping device according to the invention with a shelf;

FIG. 4 shows a further detail view of the clamping device according to the invention in a clamped position without a shelf;

FIG. 5 shows a first perspective view of a clamping lever;

FIG. 6 shows a further perspective view of the clamping lever;

FIG. 7 shows a first perspective view of a first connecting element;

FIG. 8 shows a further perspective view of the first connecting element;

FIG. 9 shows a first perspective view of a second connecting element;

FIG. 10 shows a further perspective view of the second connecting element;

FIG. 11 shows a sectional view through the second connecting element;

Figure 12:
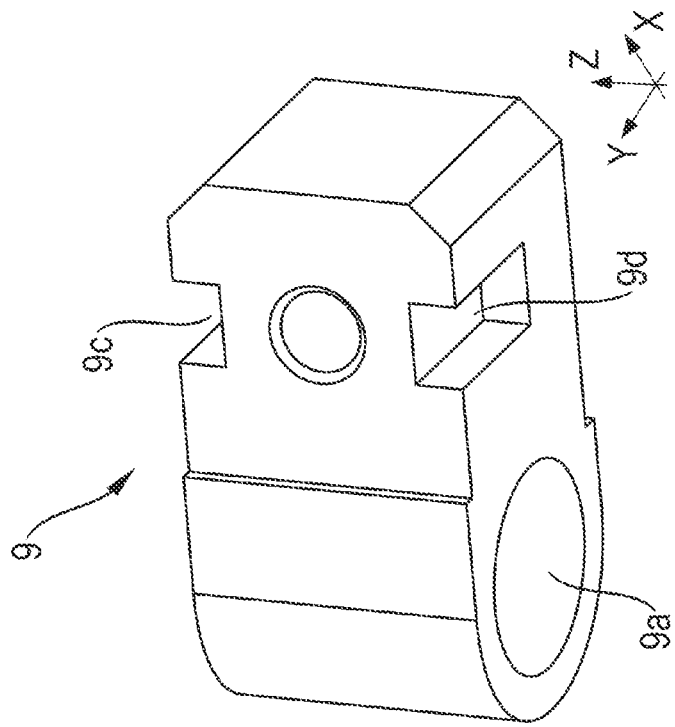
Figure 11:
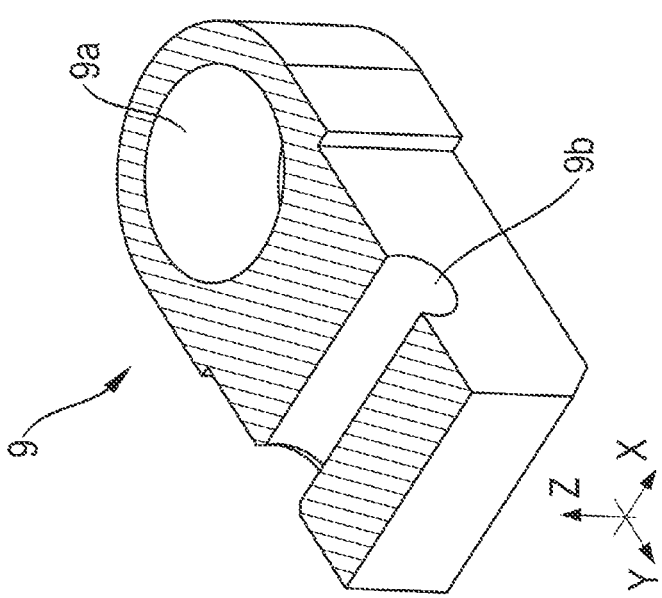
Figure 14:
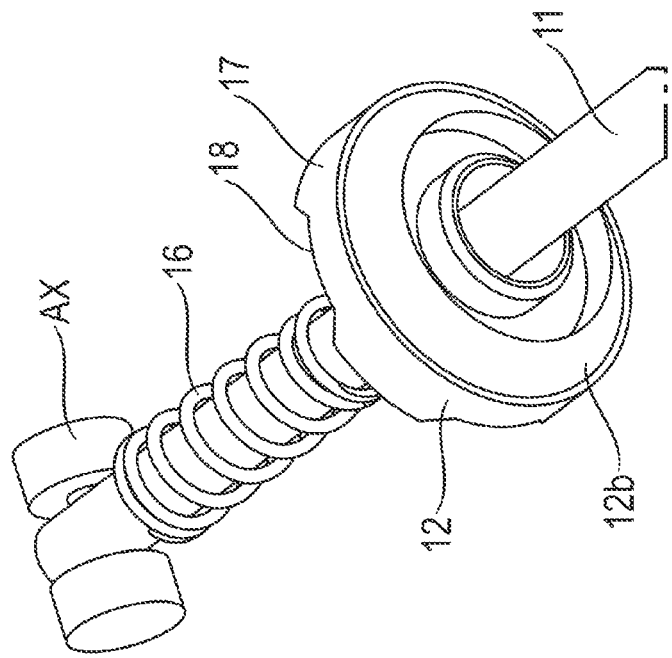
Figure 13:
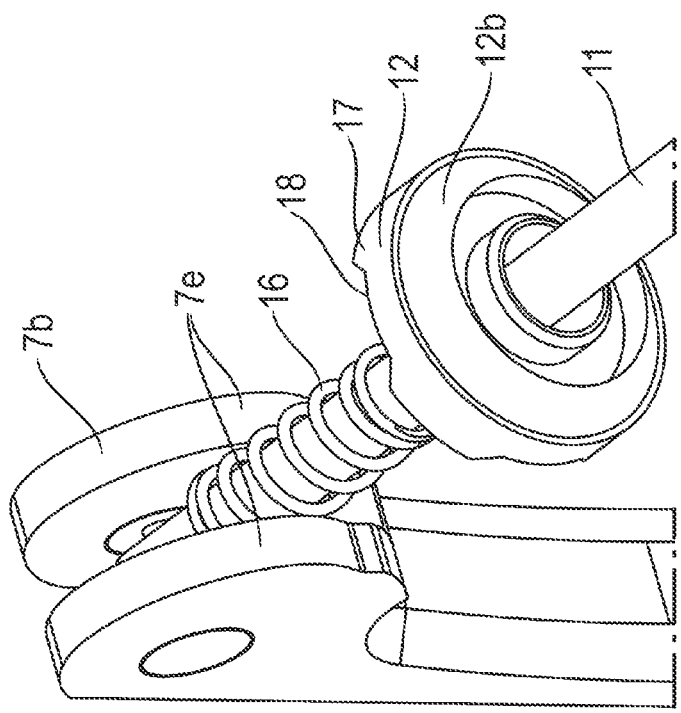
Figure 16:
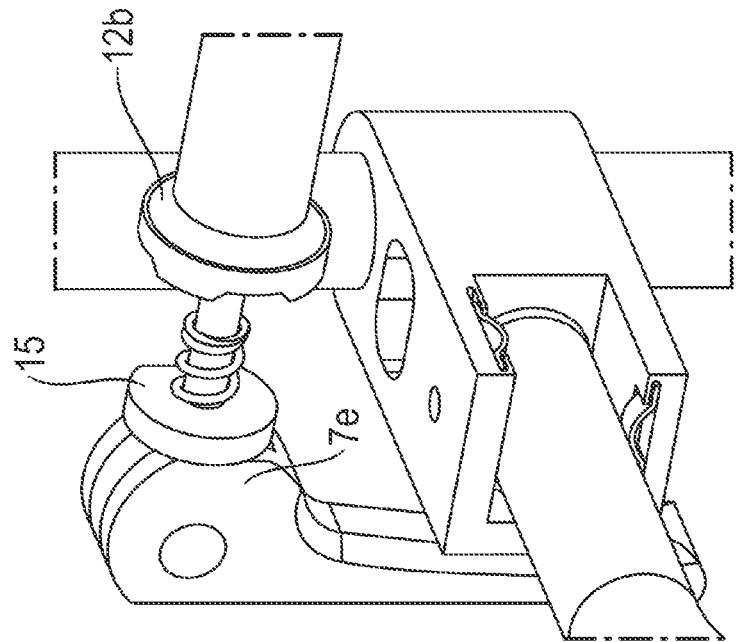
Figure 15:
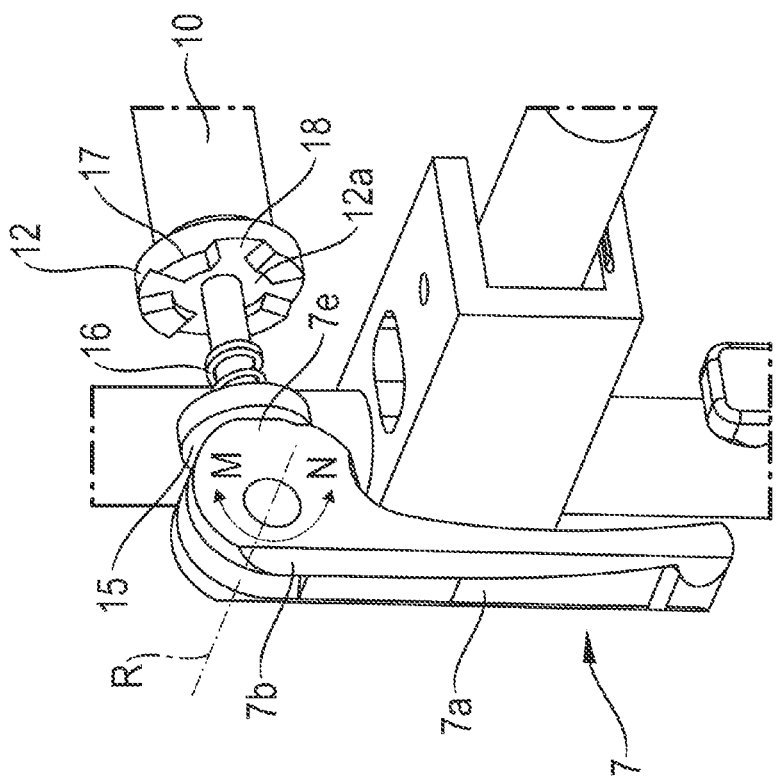
Figure 20:
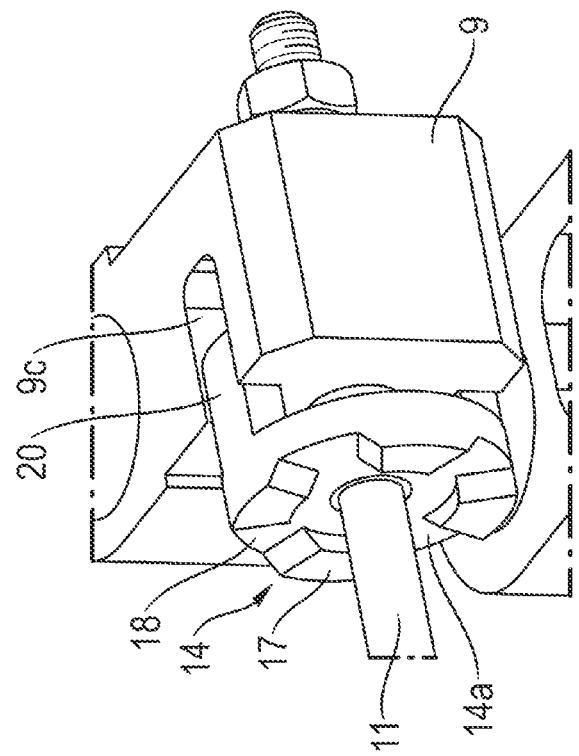
Figure 19:
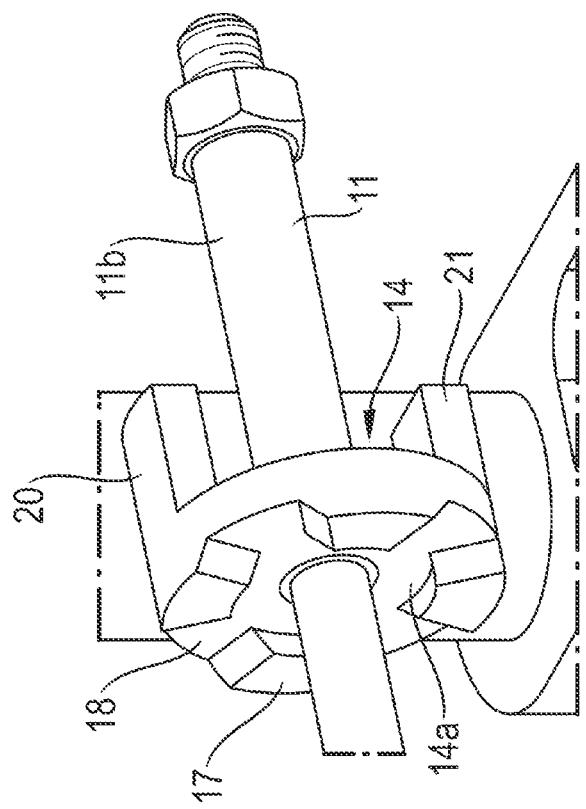
Figure 22:
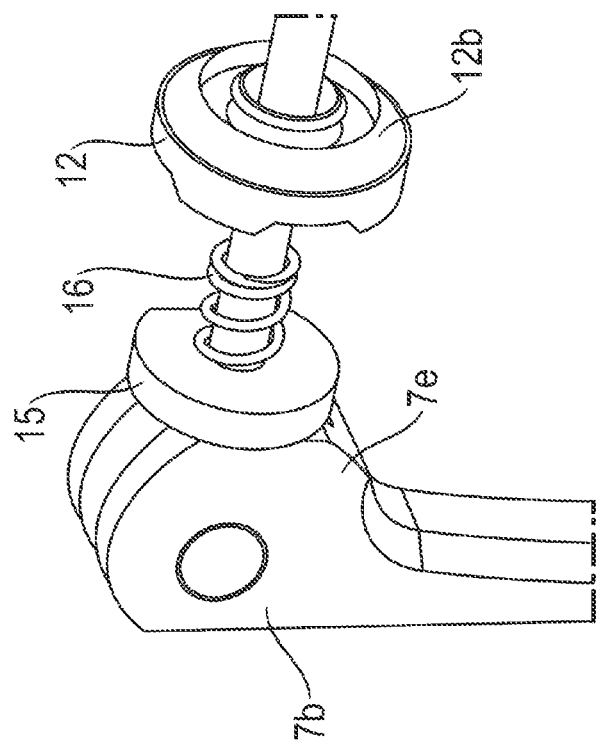
Figure 21:
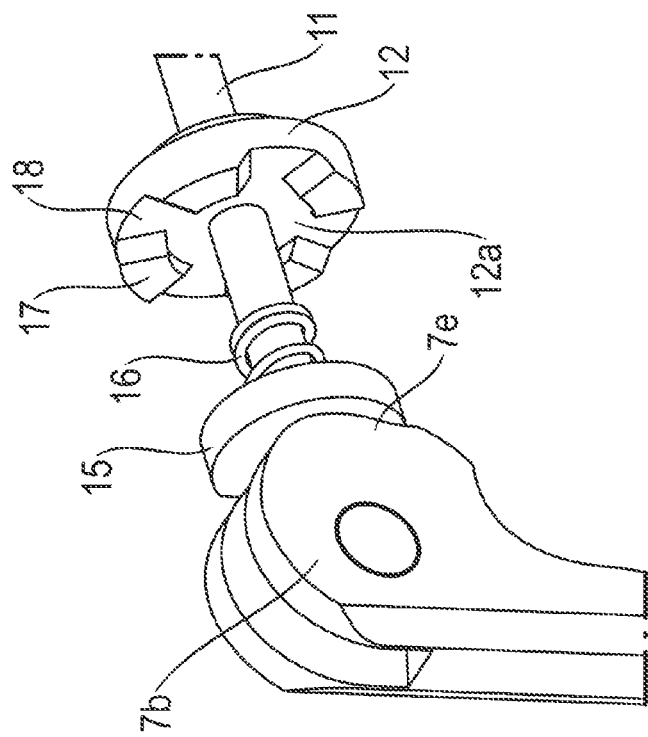
Figure 24:
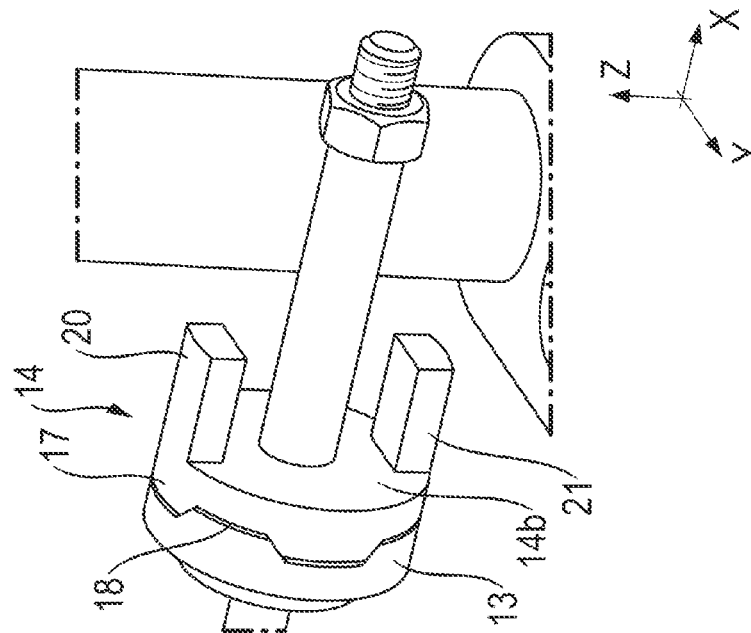
Figure 23:
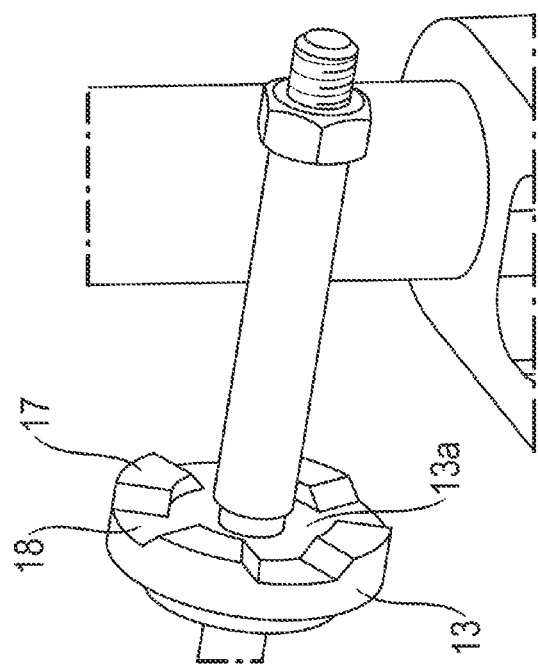
Figure 27:
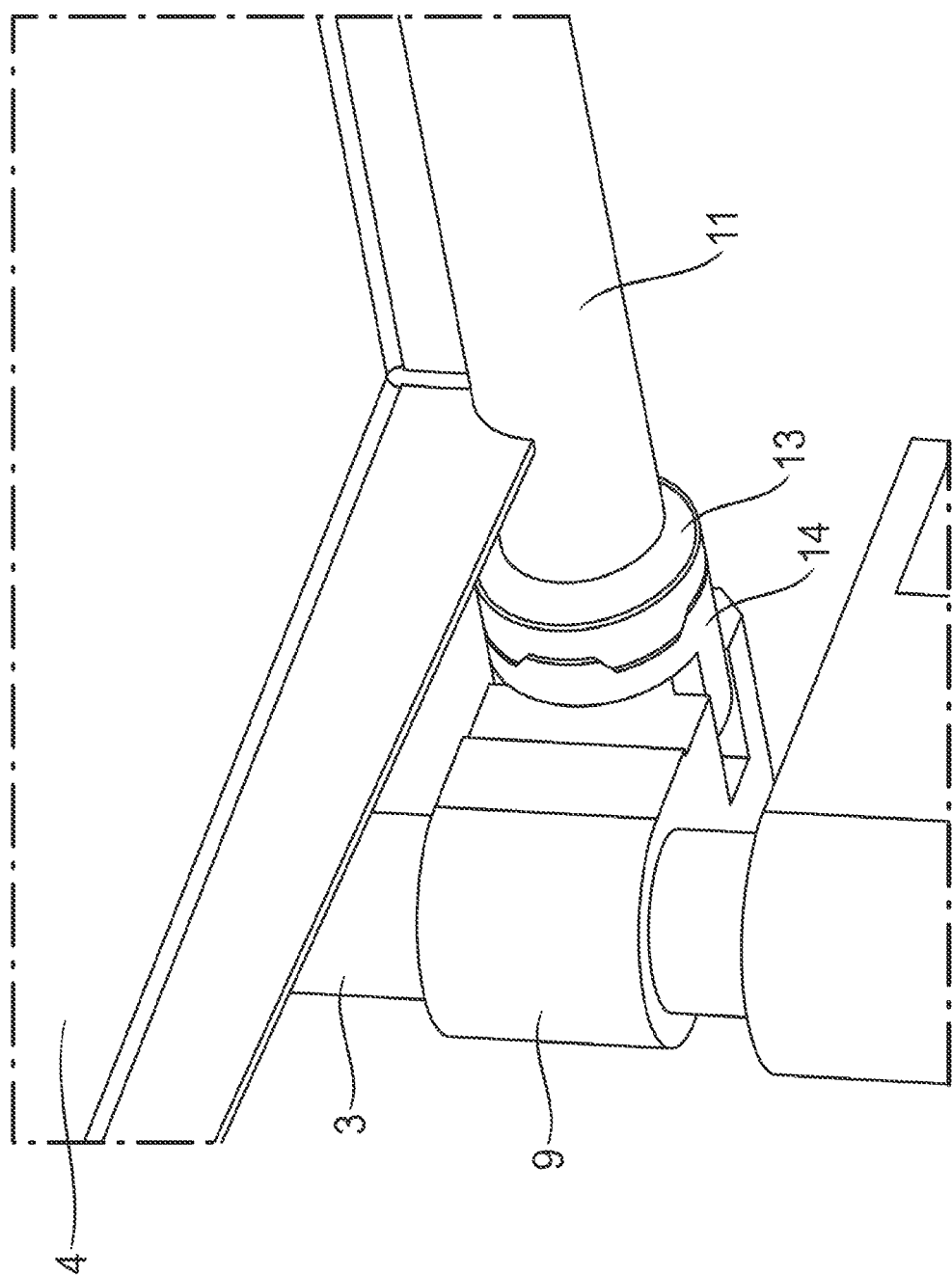
Figure 28:
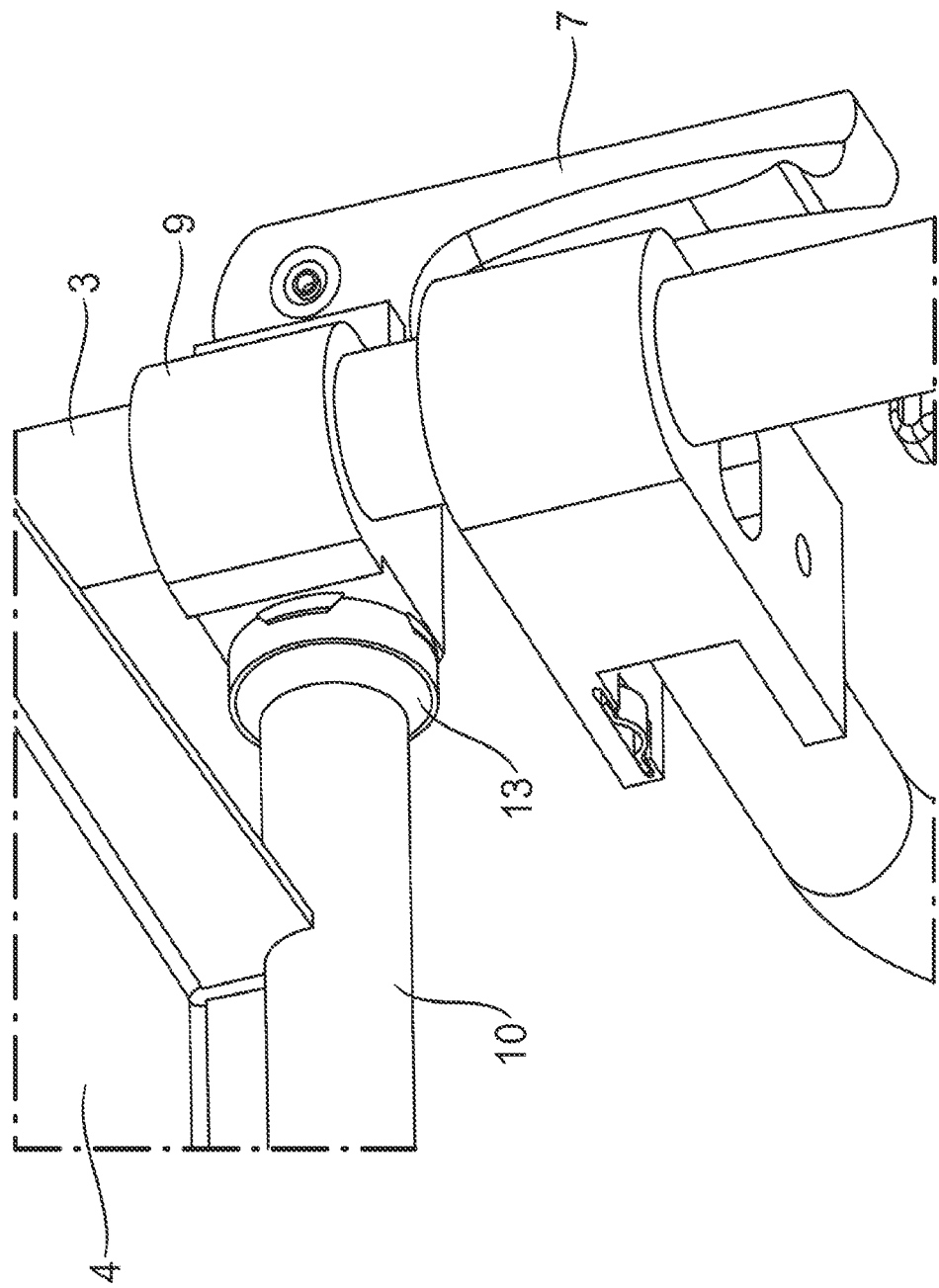
Figure 30:
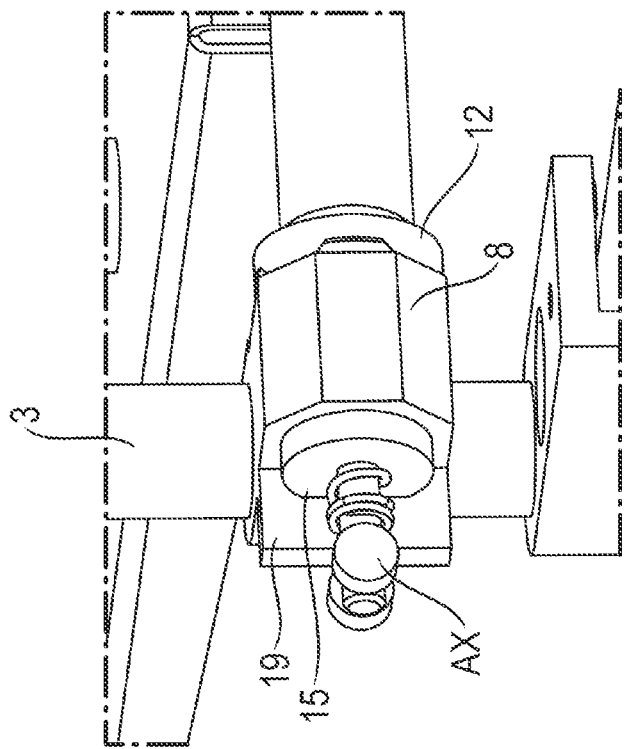
Figure 29:
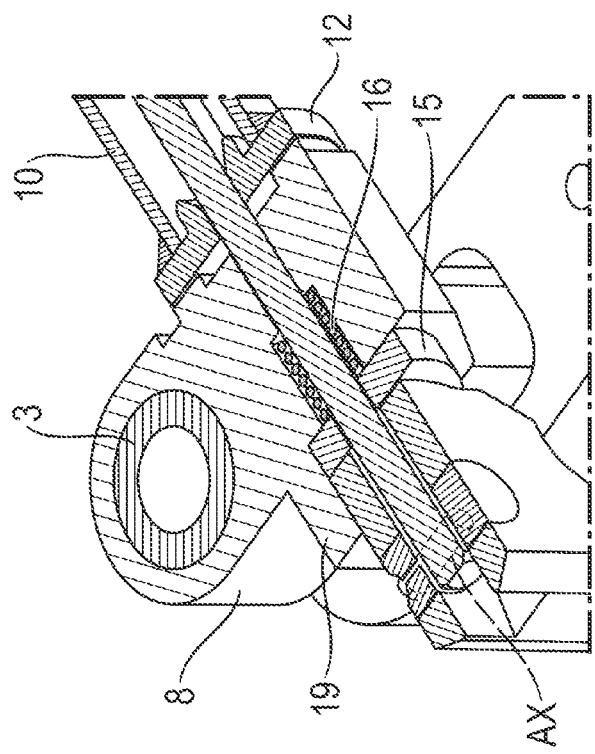

FIG. 12 shows a further perspective view of the second connecting element;

FIG. 13 shows a perspective view of the clamping lever, a spring element, a first end of a pull rod and a first positioning element;

FIG. 14 shows a perspective view of an axle of the clamping lever, the spring element, the first end of the pull rod and the first positioning element;

FIG. 15 shows a further perspective view of the clamping lever, the first end of the pull rod, the first positioning element, an attachment element and a part of a frame of the load transport trolley;

FIG. 16 shows a further perspective view of the clamping lever, the first end of the pull rod, the first positioning element, the attachment element and a part of the frame of the load transport trolley;

FIG. 17 shows a perspective view of the first end of the pull rod, the axle of the clamping lever, the spring element, the first positioning element and a part of the frame of the load transport trolley;

FIG. 18 shows a sectional view through the first connecting element;

FIG. 19 shows a perspective view of the second end of the pull rod, the second positioning element and a part of the frame of the load transport trolley;

FIG. 20 shows a further perspective view of the second end of the pull rod, the second positioning element, the second connecting element and a part of the frame of the load transport trolley;

FIG. 21 shows a further perspective view of the clamping lever, the spring element, the first end of the pull rod and the first positioning element;

FIG. 22 shows a further perspective view of the clamping lever, the spring element, the first end of the pull rod and the first positioning element;

FIG. 23 shows a further perspective view of the second end of the pull rod, the second positioning element and a part of the frame of the load transport trolley;

FIG. 24 shows a further perspective view of the second end of the pull rod, the second positioning element, a blocking element and a part of the frame of the load transport trolley;

FIG. 25 shows a further perspective view of the second end of the pull rod, the second positioning element, the blocking element, the second connecting element and a part of the frame of the load transport trolley;

FIG. 26 shows a further perspective view of the second end of the pull rod, the second positioning element, the blocking element, the second connecting element and a part of the frame of the load transport trolley;

FIG. 27 shows a bottom view of the second end of the pull rod, the second positioning element, the second connecting element, the blocking element, a part of the frame of the load transport trolley, the attachment element and a part of the shelf;

FIG. 28 shows a bottom view of the first end of the pull rod, the first positioning element, the first connecting element, a part of the frame of the load transport trolley, the attachment element and a part of the shelf;

FIG. 29 shows a sectional view of the clamping lever, the first connecting element, the first end of the pull rod, the attachment element, the spring element, the first positioning element and the frame of the load transport trolley; and FIG. 30 shows a perspective view of the first end of the pull rod, the first connecting element, the spring element, the first positioning element, the axle of the clamping lever and a part of the frame of the load transport trolley.

DETAILED DESCRIPTION

Figure 1:
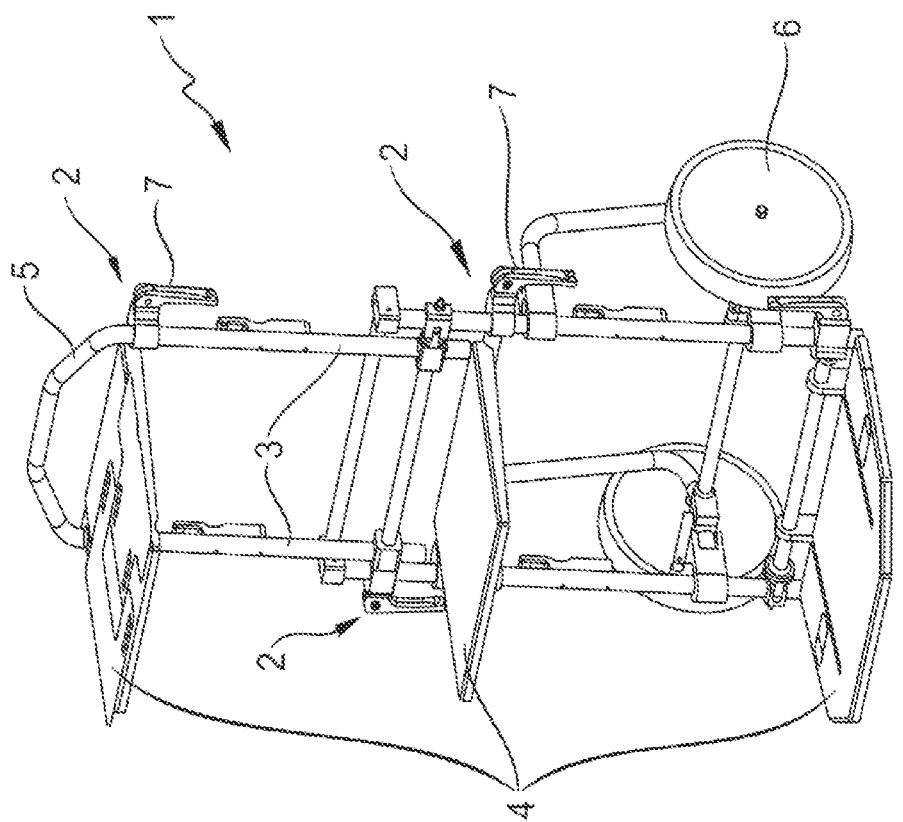
Figure 2:
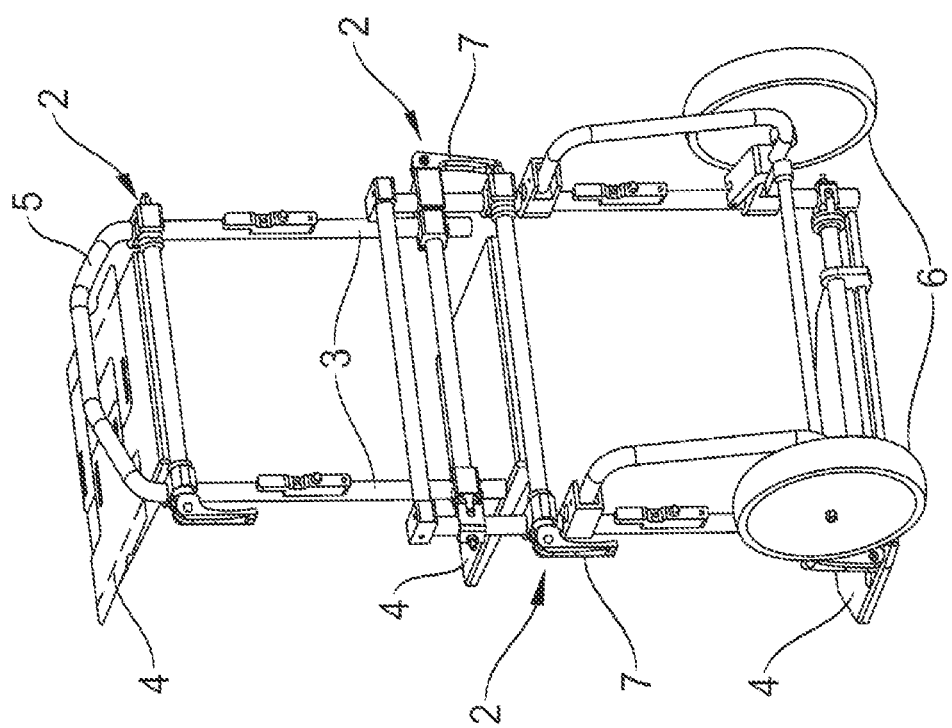

FIGS. 1 and 2 show a load transport trolley 1 having a clamping device 2 according to invention. The load transport trolley 1 serves for transporting loads, preferably toolboxes. The load transport trolley 1 substantially comprises a tubular frame 3, three shelves 4, a handle 5, two wheels 6 and the clamping device 2. It is possible here that the load transport trolley 1 comprises more or fewer than three shelves 4. A clamping device 2 can be provided for each shelf 4 in order to fix or position the shelf 4 in any desired position or orientation according to the invention.

As illustrated in FIG. 3, the clamping device 2 substantially comprises a clamping lever 7, an axle 8 of the clamping lever 7, a first connecting element 8, a second connecting element 9, an attachment element 10, a pull rod 11 (see, e.g., FIG. 13), a first positioning element 12, a second positioning element 13, a blocking element 14, a stop element 15 and a spring element 16 (see, e.g., FIG. 13).

Figure 6:
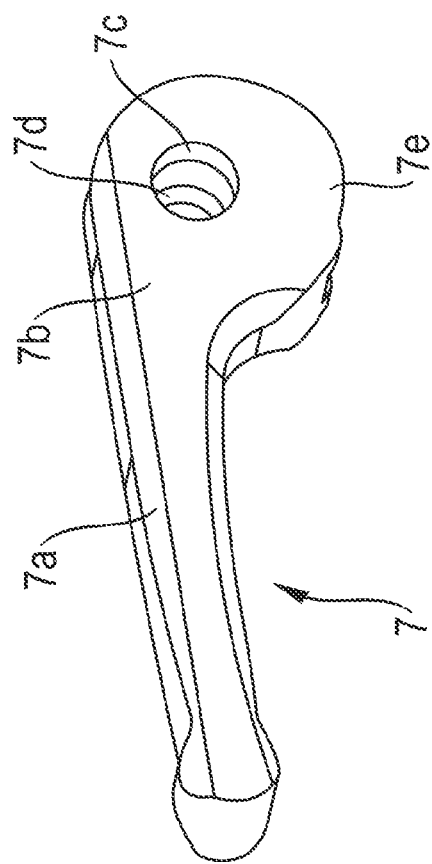
Figure 5:
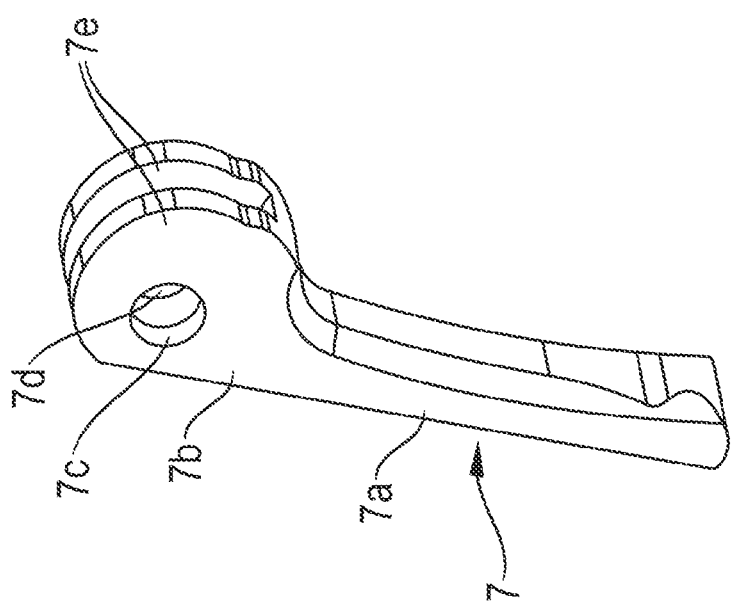
Figure 10:
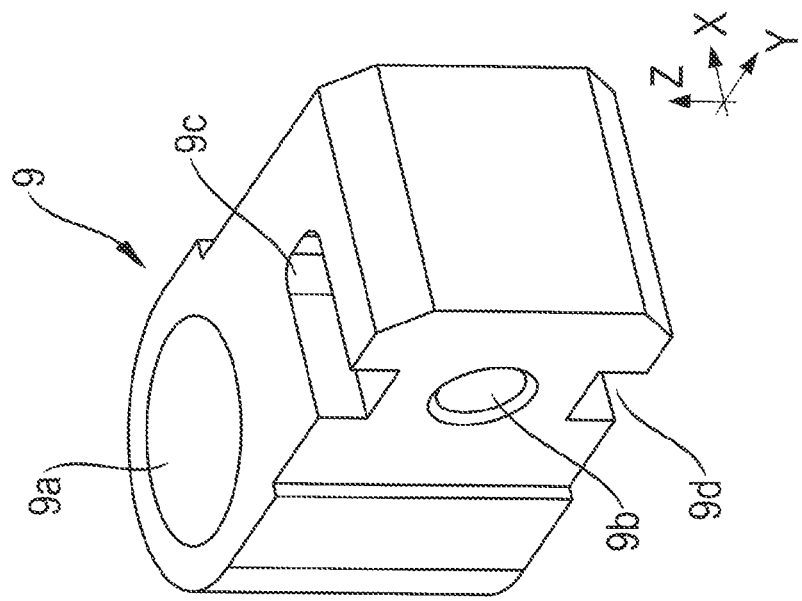
Figure 9:
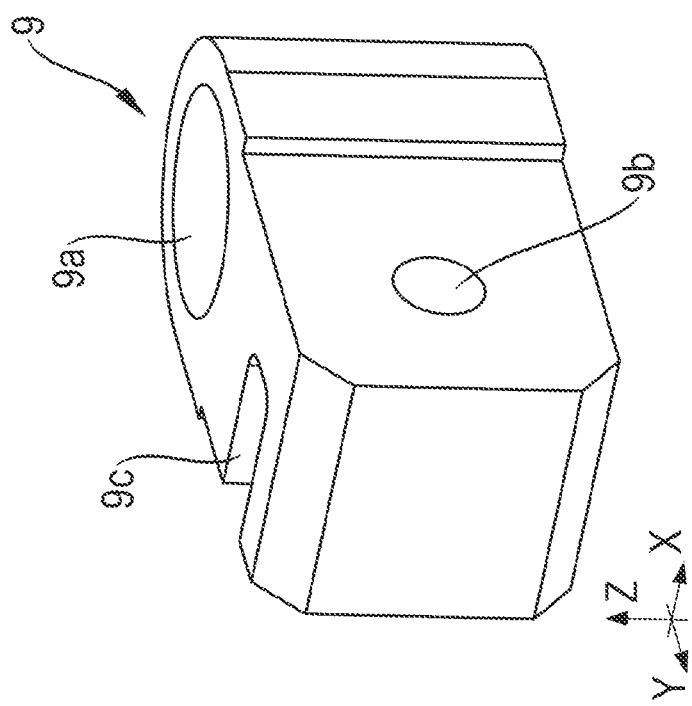

The clamping lever 7 comprises a grip portion 7a and a connecting portion 7b, cf. FIGS. 5 and 6. The connecting portion 7b for its part comprises two apertures 7c, 7d for the axle AX of the clamping lever 7, said axle serving to connect the connecting portion 7b to the pull rod 11 (see, e.g., FIGS. 13 and 14). Furthermore, the clamping lever 7 comprises a rounded projection 7e on the connecting portion 7b. The rounded projection 7e can also be referred to as a cam or eccentric. As will be described in detail below, the rounded projection 7e serves to exert a force on the pull rod 11 when the clamping device 2 or the clamping lever 7 is moved from a clamped position into a released position, with the result that the pull rod 11 is moved from a first position into a second position.

As shown in FIGS. 7, 8 and 18, the first connecting element 8 substantially comprises a main body with a first through-bore 8a for mounting the first connecting element 8 on the tubular frame 3 of the load transport trolley 1 and with a second through-bore 8b for receiving the pull rod 11 and the spring element 16.

The first through-bore 8a and the second through-bore 8b are arranged substantially at a right angle to one another.

The second through-bore 8b is of two-part design, with the result that a first portion of the second through-bore has a larger diameter than a second portion of the second through-bore. The larger diameter of the first portion of the second through-bore 8b allows the spring element 16 to be received in the second portion while being positioned around the pull rod 11. Furthermore, the first connecting element 8 comprises a first lateral surface 8c and a second lateral surface 8d. The two lateral surfaces 8c, 8d are arranged substantially parallel to one another. The first lateral surface 8c of the first connecting element 8 has four elevations 17 arranged uniformly relative to one another. The elevations 17 are designed in the form of teeth, with a respective interspace 18 being provided between the individual teeth. An interspace 18 corresponds in its dimensions and shape to an elevation 17 designed as a tooth. The second lateral surface 8d has a supporting element 19 which extends perpendicularly from the second lateral surface 8d. According to an alternative embodiment, the first lateral surface 8c can comprise more or fewer than four elevations 17. The supporting element 19 serves for supporting the clamping lever 7 of the first connecting element 8, cf. FIGS. 29 and 30.

As shown in FIGS. 9, 10, 11 and 12, the second connecting element 9 substantially comprises a main body with a first through-bore 9a for mounting the second connecting portion on the tubular frame 3 of the load transport trolley 1 and with a second through-bore 9b for receiving the pull rod 11. The pull rod 11 comprises a first end 11a and a second end 11b. The second end 11b is connected to the blocking element 14. Just like in the first connecting element 8, the first through-bore 9a and the second through-bore 9b are arranged substantially at a right angle to one another in the second connecting element 9, too. Moreover, the second connecting element 9 comprises a first recess 9c and a second recess 9d, with the first recess 9c being positioned above the second through-bore 9b in arrow direction Z, and the second recess 9d being positioned below the second through-bore 9b counter to the arrow direction Z. Both recesses 9c, 9d extend parallel to the second through-bore 9b.

The attachment element 10 is substantially designed as a cylindrical tube and, as illustrated in FIG. 4, positioned around the pull rod 11, or the pull rod 11 can be received in the interior of the attachment element 10. As is evident from FIG. 3, a shelf 4 extends from the attachment element 10 counter to the arrow direction X, said shelf being fastened to the attachment element 10 by a first edge side 4a and being substantially designed as a plate. Furthermore, the attachment element 10 comprises a first end 10a and a second end 10b. The first positioning element 12 is fastened to the first end 10a, and the second positioning element 13 is fastened to the second end 10b, cf. FIGS. 3 and 4. The first positioning element 12 is substantially designed as a ring and comprises a first lateral surface 12a and a second lateral surface 12b. Four elevations 17 in the form of teeth with interposed interspaces 18 are provided on the first lateral surface 12a of the first positioning element 12. An interspace 18 corresponds in its dimensions and shape to an elevation 17 designed as a tooth. The shape and arrangement of the elevations 17 designed as teeth on the first lateral surface 12a of the first positioning element 12 corresponds to the elevations 17 designed as teeth on the first lateral surface 8a of the first connecting element 8. In other words: the elevations 17 designed as teeth on the first lateral surface 12a of the first positioning element 12 fit into the interspaces 18 between the elevations 17 designed as teeth on the first lateral surface 8c of the first connecting element 8.

The second positioning element 13 is also substantially designed as a ring and comprises a first lateral surface 13a and a second lateral surface 13b. Four elevations 17 in the form of teeth with interposed interspaces 18 are provided on the first lateral surface 13a of the second positioning element 13.

As illustrated in FIGS. 19, 20, 23, 24, 25 and 26, the blocking element 14 is substantially designed in the form of a ring with a first lateral surface 14a and second lateral surface 14b. As already mentioned above, the blocking element 14 is connected to the second end 11b of the pull rod 11 such that a movement of the pull rod 11 is transmitted to the blocking element 14 in arrow direction X or counter to the arrow direction X. The first lateral surface 14a of the blocking element 14 has four elevations 17 arranged uniformly relative to one another. The elevations 17 are designed in the form of teeth, with a respective interspace 18 being provided between the individual teeth. An interspace 18 corresponds in its dimensions and shape to an elevation 17 designed as a tooth. The shape and arrangement of the elevations 17 designed as teeth on the first lateral surface 14a of the blocking element 14 corresponds to the elevations 17 designed as teeth on the first lateral surface 13a of the second positioning element 13. In other words: the elevations 17 designed as teeth on the first lateral surface 14a of the blocking element 14 fit into the interspaces 18 between the elevations 17 designed as teeth on the first lateral surface 13a of the second positioning element 13.

Furthermore, the blocking element 14 comprises, on the second lateral surface 14b, a first pin 20 and a second pin 21 which are positioned one above the other in arrow direction Z. The cross-sectional area of the first pin 20 substantially corresponds to the cross-sectional area of the first recess 9c of the second connecting element 9, and the cross-sectional area of the second pin 21 substantially corresponds to the cross-sectional area of the second recess 9d of the second connecting element 9.

FIGS. 25 and 26 show the clamping device 2 in a clamped position, with the length A of the first or second recess 9c, 9d of the second connecting element 9 being greater than the length B of the first or second pin 20, 21 of the blocking element 14. Here, the length C between the free end of the first or second pin 20, 21 and the end of the first or second recess 9c, 9d is longer than the height D of an elevation 17 designed as a tooth.

According to an alternative embodiment, the blocking element 14 can comprise more or fewer than two pins 20, 21, and the second connecting element 9 can comprise more or fewer than two recesses 9c, 9d. The number of pins and the number of recesses must either be identical, or the number of recesses can be greater than the number of pins such that the pins always fit into the recesses.

In an assembled and mounted state of the clamping device 2, the first and second connecting element 8, 9 are mounted on the tubular frame 3 of the load transport trolley 1. For this purpose, a vertical portion of the tubular frame 3 of the load transport trolley 1 in each case extends through the first through-bore 8a, 9a of the first and second connecting element 8, 9, cf. FIGS. 3 and 4. The pull rod 11 extends by the first end 11a through the second through-bore 8b of the first connecting element 8 and by the second end 11b through the second through-bore 9b of the second connecting element 9. As shown in FIGS. 13 to 15, the first end 11a of the pull rod 11 is rotatably connected to the axle AX of the clamping lever 7. The axle AX extends through the two apertures 7c, 7d of the clamping lever 7 such that the clamping lever 7 can be rotated relative to the pull rod 11 about the axis of rotation R in the direction of rotation M or N. Here, the rounded projection 7e, which is designed as a cam, of the connecting portion 7b points in arrow direction X toward the first connecting element 8. The spring element 16 is designed as a compression spring and is positioned between the connecting portion 7b of the clamping lever 7 and the first connecting element 8. The spring element 16 designed as a compression spring exerts a spring force from the first connecting element 16 to the connecting portion 7b of the clamping lever 7.

The stop element 15 is positioned between the connecting portion 7b of the clamping lever 7 and the second lateral surface 8b of the first connecting element 8, cf. FIGS. 29 and 30. The stop element 15 serves as a stop or for support for the rounded projection 7e, which is designed as a cam, of the connecting portion 7b of the clamping lever 7.

The pull rod 11 is inserted into the tube-form attachment element 10 with the shelf 4.

The first positioning element 12 is positioned at the first end 10a of the attachment element 10, and the second positioning element 13 is positioned at the second end 10b of the attachment element 10. The first lateral surface 12a of the first positioning element 12 points toward the first lateral surface 8a of the first connecting element 8. The first lateral surface 13a of the second positioning element 13 points toward the first lateral surface 14a of the blocking element 14. The pins 20, 21 of the blocking element 14 are correspondingly inserted into the recesses of the second connecting element.

In FIGS. 3 and 4, the clamping device 2 is in a clamped state, with the clamping lever 7 pointing downward counter to the arrow direction Z and being in a clamped position. The rounded projection 7e, which is designed as a cam, of the connecting portion 7b of the clamping lever 7 points in arrow direction X and presses onto the stop element 15. The spring element 16 is compressed in the clamped state. The pull rod 11 connected to the clamping lever 7 is moved to its maximum extent counter to the arrow direction X. The elevations 17 designed as teeth of the first positioning element 12 are positioned in the interspaces 18 of the first connecting element 8. At the same time, the elevations 17 designed as teeth of the blocking element 14 are positioned in the interspaces 18 of the second positioning element 13. The arrangement or the angle α of the attachment element 10 with the shelf 4 in relation to the tubular frame 3 of the load transport trolley 1 is fixed in the clamped state.

In a released state of the clamping device 2, the clamping lever 7 is placed perpendicularly in arrow direction Y and is in a released position. The rounded projection 7e, which is designed as a cam, of the connecting portion 7b of the clamping lever 7 points counter to the arrow direction Z and no longer presses onto the stop element 15. The connecting portion 7b of the clamping lever 7 that is connected to the first end 11a of the pull rod 11 presses the pull rod 11 counter to the arrow direction Y. At the same time, the spring element 16 between the connecting portion 7b of the clamping lever 7 and the first connecting element 8 is compressed. The energy stored in the spring element 16 assists the return of the clamping lever 7 from the released position back into the clamped position. When the pull rod 11 is pressed by the connecting portion 7b of the clamping lever 7 counter to the arrow direction Y, the blocking element 14 is likewise pressed counter to the arrow direction Y. Here, the blocking element 14 is pressed at least by the height D (height of the elevations 17 designed as teeth) counter to the arrow direction Y, cf. FIGS. 25 and 26. The pins 20, 21 of the blocking element 14 are pushed into the corresponding recesses of the second connecting element 9 at least by the height D by means of the pull rod 11.

When the pull rod 11 is pressed with the blocking element 14 in arrow direction X at least by the height D, the attachment element 10 with the first and second positioning element 12, 13 has sufficient space likewise to be pushed in arrow direction X, with the result that the elevations 17 designed as teeth of the first positioning element 12 are no longer in engagement with the elevations 17 designed as teeth of the first connecting element 8. At the same time, the elevations 17 designed as teeth of the second positioning element 13 are no longer in engagement with the elevations 17 designed as teeth of the blocking element 14.

Consequently, the attachment element 10 with the shelf 4 can be rotated relative to the tubular frame 3 of the load transport trolley 1, whereby the angle α of the attachment element 10 with the shelf 4 relative to the tubular frame 3 of the load transport trolley 1 can be changed. In particular, the shelf 4 can be placed completely downward, with the result that the shelf 4 is arranged substantially vertically and counter to the arrow direction Z.

In order to fix the shelf 4 again or set a determined angular setting of the shelf 4, the clamping device 2 is brought into the clamped state again. For this purpose, the clamping lever 7 is brought into the clamped position again. The pull rod 11 is thereby pulled counter to the arrow direction X, with the result that the blocking element 14 and the second positioning element 13 come into contact again, with the elevations 17 designed as teeth of the blocking element 14 again being in engagement with the elevations 17 designed as teeth of the second positioning element 13. At the same time, the first positioning element 12 and the first connecting element 8 are brought into contact again, with the result that the elevations 17 designed as teeth of the first positioning element 12 are again in engagement with the elevations 17 designed as teeth of the first connecting element 8.

The invention claimed is:

1. A toolbox load trolley comprising:
   a shelf; and
   a clamping device for variably positioning an angular setting of the shelf, the clamping device including:
   a clamping lever for reversibly setting the clamping device in a clamped or released position, wherein, in the released position, the shelf is movable;
   a pull rod reversibly moveable by the clamping lever into a first or second position, wherein the clamping device is in the clamped position when the pull rod is set into the first position, and the clamping device is in the released position when the pull rod is set into the second position;
   an attachment element for connecting the shelf to the clamping device; and
   a first and second connecting element for connecting the clamping device to a frame of the load transport trolley; the shelf being attached to the attachment element.

2. The toolbox load trolley as recited in claim 1 wherein the attachment element is designed in the form of a cylindrical tube arranged around the pull rod.

3. The toolbox load trolley device as recited in claim 2 wherein the clamping device further includes a first positioning element at a first end of the attachment element, and a second positioning element at a second end of the attachment element.

4. The toolbox load trolley as recited in claim 3 wherein the pull rod has a first end and a second end, the first end connectable to the clamping lever, and the second end connectable to a blocking element, with the result that, when the clamping lever is moved from the clamped position into the released position, the pull rod is brought from the first position into the second position, wherein, in the first position, the first positioning element is in a form-fitting connection with the first connecting element, and the second positioning element is in a form-fitting connection with the blocking element, and wherein, in the second position, the first positioning element is movable relative to the first connecting element, and the second positioning element is movable relative to the blocking element.

5. The toolbox load trolley as recited in claim 3 wherein the pull rod has a first end and a second end, the first end connectable to the clamping lever, and the second end connectable to a blocking element, with the result that, when the clamping lever is moved from the clamped position into the released position, the pull rod is brought from the first position into the second position, wherein, in the first position, the first positioning element is in a force-fitting connection with the first connecting element, and the second positioning element is in a force-fitting connection with the blocking element, and wherein, in the second position, the first positioning element is movable relative to the first connecting element, and the second positioning element is movable relative to the blocking element.

6. The toolbox load trolley as recited in claim 5 wherein the first positioning element includes, on a first lateral surface, a plurality of elevations, and the first connecting element includes, on a further first lateral surface, a further plurality of elevations designed to correspond to the elevations of the first positioning element, with the result that the force-fitting connection is reversibly produceable between the first connecting element and the first positioning element.

7. The toolbox load trolley as recited in claim 6 wherein the second positioning element includes, on a first second positioning element lateral surface a plurality of second positioning element elevations, and the blocking element includes, on a first blocking element lateral surface, a plurality of blocking element elevations designed to correspond to the second positioning element elevations of the second positioning element, with the result that the force-fitting connection is reversibly produceable between the blocking element and the second positioning element.

8. The toolbox load trolley as recited in claim 1 wherein the clamping lever includes a rounded projection, whereby a force is exertable on the pull rod when the clamping lever is moved from the clamped position into the released position, with the result that the pull rod is moved from the first position into the second position.

9. The toolbox load trolley as recited in claim 1 wherein the clamping device further includes a spring element designed as a compression spring between the clamping lever and the first connecting element, with the result that the clamping lever is movable from the released position counter to a spring force of the spring element into the clamped position.

10. The toolbox load trolley as recited in claim 1 wherein the clamping device further includes a blocking element including at least one pin, and the second connecting element includes a recess for receiving and guiding the at least one pin, the recess being designed to be longer in a direction X than the at least one pin, with the result that the at least one pin is movable in the recess from a first pin position into a second pin position.

11. The toolbox load trolley as recited in claim 1 wherein the shelf extends from the attachment element.

12. The toolbox load trolley as recited in claim 11 wherein the shelf is fastened at a first edge side to the attachment element.

13. The toolbox load trolley as recited in claim 1 further comprising a second shelf connected to the frame.

14. The toolbox load trolley as recited in claim 13 wherein the shelf and the second shelf are parallel.

15. The toolbox load trolley as recited in claim 13 further comprising a third shelf connected to the frame.

* * * * *